United States Patent [19]

McCarthy

[11] Patent Number: 4,964,090
[45] Date of Patent: Oct. 16, 1990

[54] ULTRASONIC FLUID LEVEL SENSOR

[75] Inventor: Michael C. McCarthy, Birmingham, Mich.

[73] Assignee: TRW, Inc., Cleveland, Ohio

[21] Appl. No.: 381,899

[22] Filed: Jul. 19, 1989

[51] Int. Cl.[5] .............................................. H04R 17/00
[52] U.S. Cl. .................................... 367/162; 367/908; 73/290 V; 340/621; 310/334
[58] Field of Search ............... 367/908, 157, 162, 176; 73/290 V; 340/621; 310/334, 365

[56] References Cited

U.S. PATENT DOCUMENTS

| | | | |
|---|---|---|---|
| 3,944,994 | 3/1976 | Fanshawe | 340/244 |
| 4,063,457 | 12/1977 | Zekulin et al. | 73/290 |
| 4,316,183 | 2/1982 | Palmer et al. | 340/621 |
| 4,432,231 | 2/1984 | Napp et al. | 73/290 V |
| 4,507,583 | 3/1985 | Jensen et al. | 73/290 V |
| 4,570,483 | 2/1986 | Sobue | 73/290 |
| 4,594,584 | 6/1986 | Pfeiffer et al. | 340/620 |
| 4,594,891 | 6/1986 | Benz et al. | 73/290 |
| 4,610,164 | 9/1986 | Sobue et al. | 73/290 |
| 4,668,945 | 5/1987 | Aldrovandi et al. | 340/621 |
| 4,679,430 | 7/1987 | Scott-Kestin et al. | 73/290 |
| 4,703,652 | 11/1987 | Itoh et al. | 73/290 |
| 4,750,117 | 6/1988 | Gregory | 340/621 |

Primary Examiner—Charles T. Jordan
Assistant Examiner—John Woodrow Eldred
Attorney, Agent, or Firm—David A. Greenlee

[57] ABSTRACT

An ultrasonic sensor for fluid levels comprises a carrier having spaed-apart legs with registering openings adapted to receive a piezoelectric transmitter and a piezoelectric receiver in the openings. The piezoelectric members are separated by the spaced legs of a ground plane engaging plates of the piezoelectric members. Resilient members in the form of coiled conductors are entrained between a snap-on cover and the transducers so as to resiliently engage the piezoelectric members against the ground plane. The conductors are coupled by crimp connectors to the leads of a cable carried by an elongated channel portion of the carrier. The crimp conenctors are caried in recessed portions of the carrier, and the carrier is over-molded to encase the connectors and the cable. The cable is in turn coupled to an electronic control module positioned remotely from the fluid sump and connected to a warning device.

11 Claims, 3 Drawing Sheets

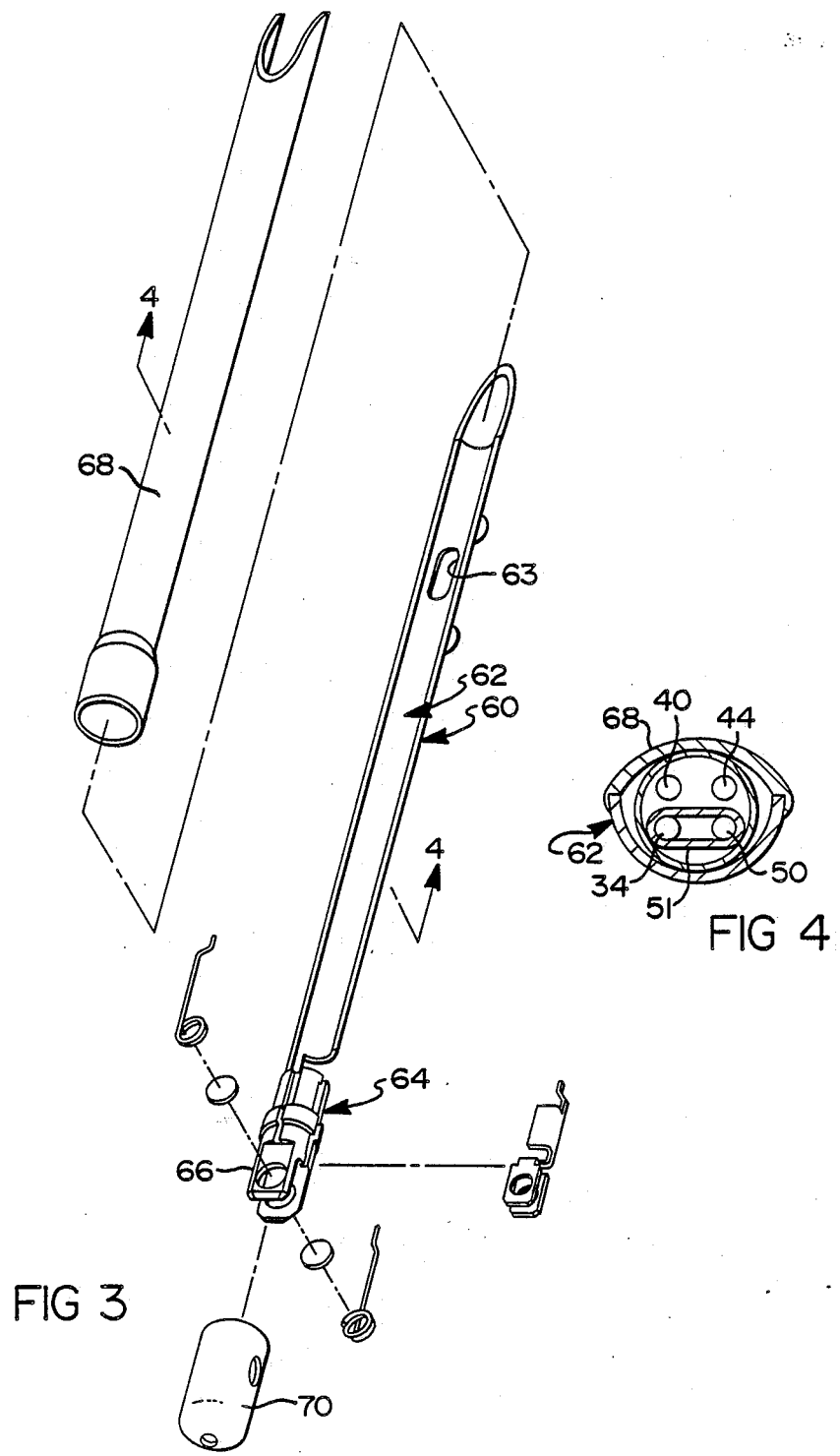

A

ULTRASONIC FLUID LEVEL SENSOR

BACKGROUND OF THE INVENTION

1. Field of the Present Invention

The present invention relates generally to fluid level sensors often used to detect the level of liquids in vehicle sumps and, more particularly, to means for mounting piezoelectric transducers in a sensor housing.

2. Description Of The Prior Art

There are many known types of liquid level sensors. However, it has been determined that ultrasonic level sensors provide several advantages over other types of sensors such as float actuated sensors. The application of an electrical voltage across the plates of a piezoelectric member induces a mechanical vibration. The vibration is transferred through a flow path between a transmitting transducer, and a receiving transducer, whereby the receiver is vibrated to induce a responsive voltage across the plate of the transducer.

The transducers are vibrated at or within a range near a resonant frequency so that the amplitudes of the vibration and the resulting electrical signal are maximized. Furthermore, the greater the physical connection through the connecting path, the greater the response signal which is generated. Of course, if the oscillation is affected by damping from mounting or frequent vibration, both the vibration amplitude and electrical signal strength can be substantially reduced. Moreover, mass production techniques often provide inconsistencies in the circuit construction, and the fluid sumps of motor vehicles often provide an unstable environment for the sensors. For example, performance can vary widely due to changes in the environment surrounding the sensor including movement of the fluid and temperature conditions, as well as quality control of the transmission or reception circuitry coupled with the sensor. Such factors combine with the previously known mounting arrangements of piezoelectric members in the sensor housing to provide varying performance characteristics when the units are installed in various installations.

For example, U.S. Pat. No. 4,063,457 to Zekulin et al discloses an ultrasonic sensing device in which each pair of a plurality of transducer assemblies is mounted to a set of parallel walls of a metallic cylinder. The sensors may be secured directly against the metallic housing. Alternatively, the crystal is seated on a number of rubber feet and then adhered in position with a thin layer of a conventional epoxy resin. However, each of these methods of construction may interfere with the signal which can be transmitted or dampen the transmission or reception of vibration. Moreover, while such damping may be relatively small, it may be compounded by loss of signal strength due to frequency changes or environmental conditions.

Moreover, a previously known construction for mounting piezoelectric members in a sensor housing in a manner which purports to avoid such problems is subject to laborious or complicated construction techniques. For example, U.S. Pat. No. 4,703,652 to Itoh et al requires a substantial number of connections between conductors, fine wires, base members, caps, piezoelectric members and the like. The assembly of such a large number of parts within a small space can be quite difficult and is especially labor intensive and time consuming. In particular, brazing and soldering of the wire connections as taught in the patent require particular handling and care.

SUMMARY OF THE PRESENT INVENTION

The present invention overcomes the above-mentioned disadvantages by providing a liquid level sensor in which the transmitter and receiver piezoelectric transducers are maintained in spaced-apart positions by a resilient member. Preferably, the resilient member is a coiled conductor entrained between an outer housing cover and the plezolectric trio member. The resilient member urges the transducer against an apertured ground plane extending between the piezoelectric transducers. A plate of each transducer is connected to a common ground by engagement with the ground or conductor. The other plate of the transmitter transducer is coupled to an oscillation circuit, preferably through the coiled conductor. The other plate of the receiver transducer is coupled, preferably through the coiled conductor, to a signaling circuit.

The sensor includes a carrier having spaced-apart openings adapted to receive the piezoelectric members. A cover housing in the form of an end cap with fluid apertures fits over the transducer receiving portion of the carrier, and preferably snap locks to the carrier. The other end of the carrier includes an elongated channel adapted to receive a cable for coupling appropriate circuit connecting leads to the conductors and the ground plane carried at the end of the transducer. Once the cable has been installed and the leads connected, the carrier channel is over-molded with covering material to retain the cable in the channel and the connected conductors are stabilized. A portion of the carrier between the conduit channel of the carrier and the end covered with the end cap includes recesses adapted to retain the couplings between the conductors and the leads of the cable in a stable position. A recess in the intermediate portion is also adapted to support a thermistor in the ground circuit to provide fluid temperature measurement capability.

The cable extends outwardly from the carrier for attachment to an electronic control module. The module can be remotely located from the fluid sump environment, and preferably low power logic circuitry can be used. The logic circuits then provide an output signal to a warning device such as a warning lamp. Moreover, the circuitry can be interfaced with additional logic signals so that operation of the warning device occurs only under a predetermined set of conditions, for example, an ignition-on or transmission shifter gear selection condition.

As a result, the present invention provides an ultrasonic sensor which is easily assembled and able to withstand the changing environmental conditions within a fluid sump of a motor vehicle. In addition, the sensor provides compensation for temperature measurement in the fluid sump. As is well known, the presence of fluid within the end cap of the sensor provides a different connecting path between the transmitter and receiver transducers than the absence of fluid between the sensors. Moreover, the end cap enables fluid to be fully drained from the connecting path when the fluid level falls below the level of the transducers. Additional advantages and features of the present invention will be readily understood from the following detailed description.

BRIEF DESCRIPTION OF THE DRAWINGS

The present invention will be more clearly understood by reference to the following detailed description of a preferred embodiment when read in conjunction with the accompanying drawing in which like reference characters refer to like parts throughout the views and in which:

FIG. 3 is an exploded perspective view of the sensor constructed in accordance with the present invention, with parts broken away for the sake of clarity.

FIG. 4 is an enlarged sectional view taken substantially along line 4—4 in FIG. 3.

DETAILED DESCRIPTION OF THE PREFERRED EMBODIMENT

Figure 1:
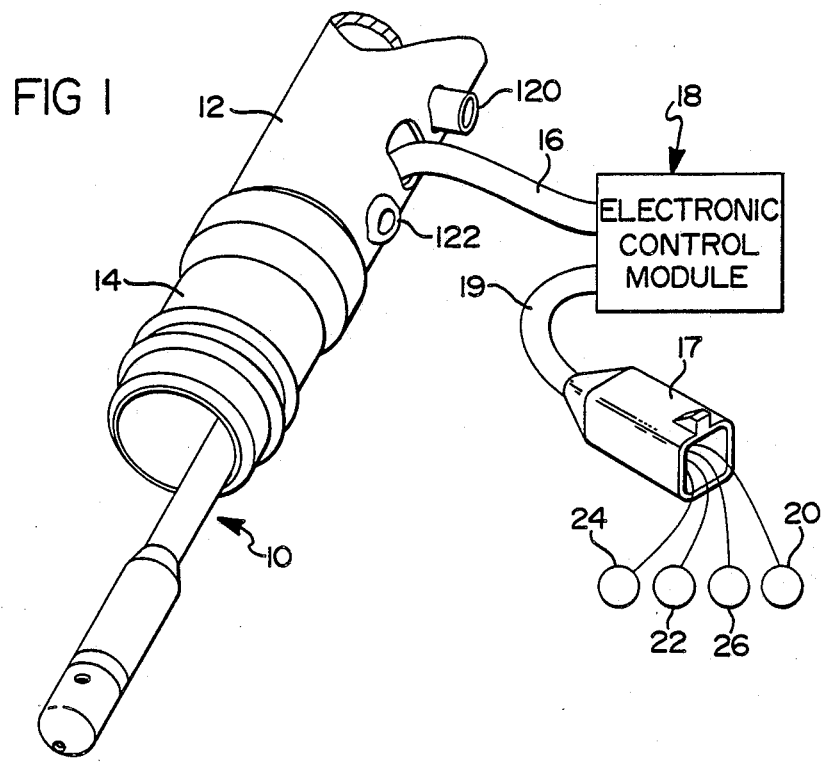
FIG. 1 is a perspective view of a fluid sensor constructed according to the present invention.

Referring first to FIG. 1, a sensor 10 constructed according to the present invention is thereshown mounted in an access tube 12 having a fitting 14 adapted to be engaged in a sump housing wall, for example, a transmission fluid sump wall. The sensor 10 is coupled by a conduit 16 to an electronic control module 18 to be described in greater detail hereinafter. An output cable 19 from the control module has a connector 17 having terminals for coupling the electronic control module 18 to a warning device 20 such as a warning lamp, a ground connection 22, a power supply connection 24, preferably responsive to ignition switch actuation, and one or more logic inputs 26 which comprise connections to the ignition switch, shift selector position switches or the like as input to the switching control circuit 59, indicated diagrammatically in FIG. 1. The control module 18 may also include a level sensor switch, for example, a well-known mercury bead switch, to form an additional logic input for actuation of the warning device 20. Preferably, the fitting 14 of the access tube is engaged in the top wall of the sump so that the sensor 10 extends substantially vertically, as will be discussed in greater detail with respect to FIG. 3.

Figure 2:
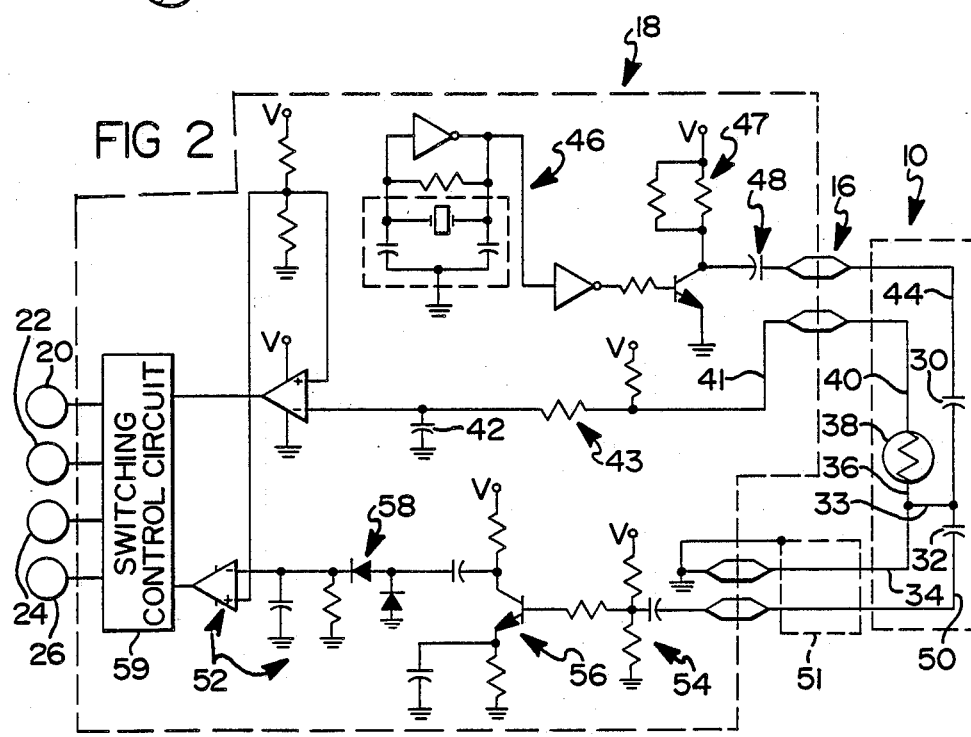
FIG. 2 is a schematic diagram of a sensing circuit constructed in accordance with the present invention.

Referring now to FIG. 2, the sensor 10 is thereshown having a first piezoelectric member 30 forming a transmitter and a second piezoelectric member 32 forming a receiver. The plates or terminals of each member 30 and 32 are silver plated for corrosion resistance. A plate of each transducer 30 and d 32 is commonly connected to a ground plane or conductor 33. A first conductor 34 is coupled to the ground plane 33 and to ground. A second conductor 36 coupled to the ground plane 33 is connected to a thermistor 38 whose output conductor 40 is coupled to an input line 41 of a temperature threshold detection circuit 43. The temperature detection circuit includes a low pass filter 42 in the form of a capacitor and a resistor to filter out induced signals before comperision with a reference once voltage. When a voltage signal generated by the thermistor exceeds a predetermined reference voltage, the threshold detector provides an input signal to the switching control circuit 59.

The other plate of the transducer 30 is coupled through a conductor 44 to a 2.5 MHz oscillation circuit 46 through a DC removing filter 48 such as a capacitor to prevent electrolysis reaction in the transducers. Removal of the DC component prevents oxidation in the transducer and the conductor contacting surfaces. The other terminal of the receiver 32 is coupled by a conductor 50 to the input of a comparator circuit 52 including a 1.0 MHz high pass filter 54 in the form of capacitor and resistors, an amplifier 56, and a rectifier 58. A 1.0 MHz high pass filter is used to reject any signals induced in the transducers resulting from mechanical vibrations in the sensor environment. Logic outputs from the temperature threshold detection circuit 42 and the comparator circuit 52 are delivered to the switching control circuit 59 used to determine whether the warning device 20 is activated. As shown in FIGS. 2 and 4, the conductors 50 and 34 are enclosed within a common grounded shield 51 such as a foil wrap to prevent crosstalk between the receiver and transmitter circuits.

In the switching control circuit 59, one or a combination of condition-responsive switches may trigger actuation of the warning device 20. For example, placement of the transmission in a park or neutral position and engagement of the key start switch may close a switch to activate the warning device 20 regardless of the condition of the sensor switch. In addition, whenever a logic signal is generated from the comparator circuit 52 or the temperature sensing compensator circuit 43, a switch within the switching circuit 59 will actuate the warning device 20. Similarly, other switches or combinations of switches such as an ignition-on responsive switch and the liquid level tilt responsive switch may be necessary to activate the warning device 20.

As shown in FIG. 3, the sensor 10 comprises a body including a carrier 60, preferably made in one piece of an insulating material such as plastic. The carrier 60 includes an elongated channel portion 62 adapted to carry the cable 16 and having a cable access opening 63. The channel portion 62 is adjacent to a solid body portion 64 having recesses to be described in greater detail hereinafter. The solid intermediate portion 64 lies adjacent the transducer supporting end portion 66. An overmolded body portion 68 encloses the channel in the channel portion 62 as shown in FIG. 4 and encloses the recesses in the solid intermediate portion 64 once the conductors have been installed in a manner to be described in detail hereinafter. A separate end cap 70 fits over the end 66 of the carrier 60.

Figure 5:
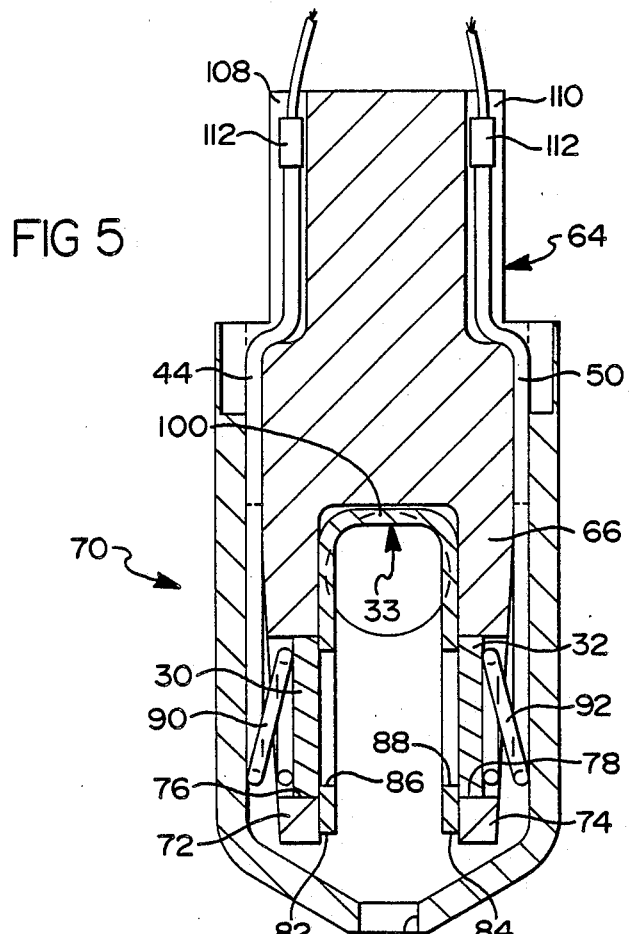
FIG. 5 is an enlarged sectional view of the portion of the sensor shown in FIG. 1.

As best shown in FIG. 5, the end 66 includes a pair of legs 72 and 74. The legs 72 and 74 have registering apertures 76 and 78, respectively, adapted to receive piezoelectric members 30 and 32. The legs 82 and 84 lie against the legs 72 and 74 within the space between the legs 72 and 74, and include registering openings 86 and 88, respectively. The openings 86 and 88 have a reduced diameter in relation to the openings 76 and 78 so that the periphery of the openings engage the piezoelectric members 30 and 32, respectively. The opening 76 also receives a coiled strand portion 90 of the conductor 44. Similarly, the opening 78 receives a coiled strand portion 92 of a conductor 50. Each of the conductors 44 and 50 is formed of a strand of conductive spring metal.

Figure 6:
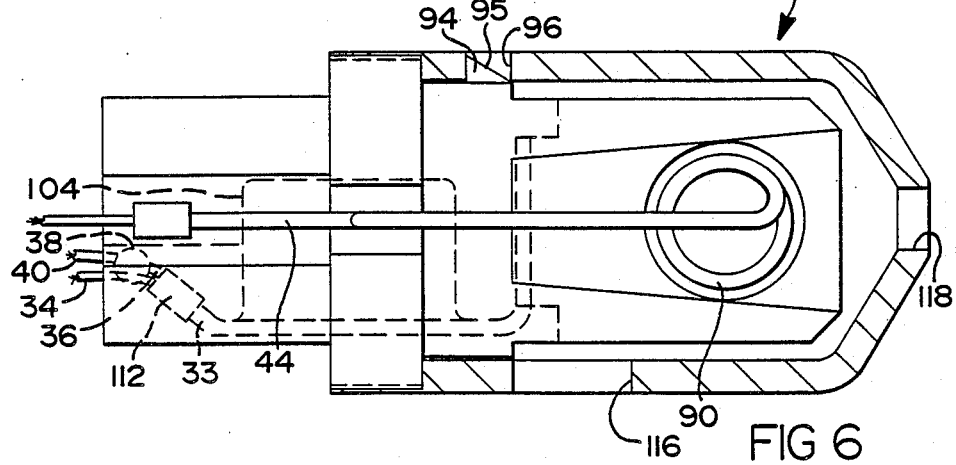
FIG. 6 is a transverse sectional view through the portion of the sensor shown in FIG. 3.

The components discussed above are retained in position by a hollow body such as the end cap 70. For example, a projection 94 having a ramp surface 95 extends radially outwardly from the intermediate portion 64 of the carrier 60 (see FIG. 6) for engagement in an opening 96 in the end cap 70. As shown in FIG. 5, with the end cap 70 locked in position, the coiled portions 90 and 92 of the conductors 44 and 50, respectively, are resiliently entrained between the end cap and the respective piezoelectric members. As a result, the conductors 44 and 50 urge the piezoelectric members into a spaced parallel relationship against the legs 82 and 84 of the ground plane 33.

The end cap 70 also retains the ground plane 33 in a fixed position. In the preferred embodiment, the ground plane 33 is formed of a single piece of conductive material, for example, a metal stamping. The plane 33 includes a cross member 100 connecting the legs 82 and 84 extending from an arm 102. The arm 102 includes a spade 104 received in a slot within the solid intermediate portion 64. The slot communicates with a recess 105 receiving the thermistor 38 and the crimped coupling 112 connecting the thermistor conductor 36 and the ground conductor 34 to the ground plane 33. (See FIG. 6.) The intermediate portion 64 also includes recesses 108 and 110 adapted to receive the crimp connectors 112 coupling the conductors 44 and 50 to the leads of the cable 16. The elongated portion 62 and the intermediate portion 64 are over-molded with the covering 68 to retain the couplings in a fixed position.

The space between the piezoelectric members 30 and 32 communicates exteriorly of the sensor body through a transverse opening 116 positioned above the transducers 30 and 32, and a bottom opening 118 positioned at the lowermost point of the tapering bottom wall of the end cap 70 positioned below the transducers 30 and 32. Accordingly, it will be understood that the fluid level within the sump exteriorly of the sensor 10 will be reflected by the level of fluid within the end cap 70. As long as the fluid level is above the transducers 30 and 32, the flow path created between the transmitter 30 and the receiver 32 will provide a predetermined response between the transmitter and the receiver. Similarly, once the fluid level in the sump falls below the level of the transducers, the connecting path between the transmitter and the receiver will modify the signal generated by the receiver.

Having thus described the important structural features of the present invention, it will be readily understood that the present invention provides a fluid level sensor which is substantially easier to assemble than previously known ultrasonic fluid level sensors. Moreover, the transducers are resiliently supported in relatively fixed positions by resilient members to avoid damping of the vibrations induced in the transmitter by an electrical signal and induced in the receiver by the flow path coupling the transducers. This structural design results in a consistent, minimal shifting of the transducer natural resonant frequency in the thickness mode.

In addition, the tapered shape of the bottom wall of the end cap assures that the end cap will not retain fluid in the space between the transducers. When the fluid level in the sump is below the transducer positions, any remaining fluid will be vented by the transverse opening 16 and be forced to flow downwardly along the tapered bottom wall through the bottom opening 118.

Moreover, the simple crimp couplings between the conductors of the sensor and the leads of the conduit are protected from environmental conditions and movement by the over-mold covering. In addition, the plastic construction the carrier is advantageous for mounting of the sensor 10 in the access conduit 12. For example, a pair of projections 120 and 122 on opposite sides of the communication opening 63 can be inserted through openings in the access tube 12 and can be expanded over the openings by heating, peening or the like as shown at 122 in FIG. 1. Preferably, heating is used so that the carrier material deforms and seals the openings through which the projections 120 and 122 extend, and seals the opening 63 (FIG. 3) through which the cable 16 extends so as to stably support the sensor in the sump and protect the electrical components from environmental conditions.

Having thus described the present invention, many modifications thereto will become apparent to those skilled in the art to which it pertains without departing from the scope and spirit of the present invention as defined in the appended claims.

What is claimed is:

1. In combination with an ultrasonic fluid level sensor having a spaced transmitter piezoelectric member and a receiver piezoelectric member carried in a housing insertable into a fluid reservoir, the improvement comprising:

a resilient support for resiliently urging at least one of said piezoelectric members toward a ground conductor in a relatively fixed position in said housing, whereby ultrasonic damping of said member is reduced.

2. The invention as described in claim 1 wherein said resilient support comprises a coiled conductor.

3. The invention as described in claim 1 wherein said sensor includes a ground conductor between said piezoelectric members;

and wherein said resilient support biases said at least one member against said ground conductor.

4. The invention as described in claim 3 wherein said ground conductor includes an opening registering with said at least one member, and wherein said resilient support urges said at least one member against the periphery of the opening.

5. The invention as described in claim 3 and further comprising a carrier and a hollow body covering said carrier, and wherein said resilient member is entrained between said piezoelectric member and said body.

6. The invention as described in claim 5 wherein said carrier includes a pair of spaced legs, each leg having an opening dimensioned to receive a piezoelectric member and aligned in registration with the opening in the other leg.

7. The invention as described in claim 6 wherein said hollow body includes a first body opening and a second body opening in communication with the space between said spaced legs, wherein said first opening is positioned above said piezoelectric members and said second opening is positioned below said piezoelectric members.

8. The invention as described in claim 7 wherein said body has a bottom wall and wherein said second opening is in said bottom wall.

9. The invention as described in claim 8 wherein said bottom wall is tapered toward said opening.

10. The invention as described in claim 6 wherein said resilient support comprises a conductor having a coiled strand portion and wherein said coiled portion is dimensioned to fit within one of said leg openings.

11. An ultrasonic sensor comprising:
a transmitter piezoelectric member;
a receiver piezoelectric member;

a carrier having spaced openings shaped to receive said transmitter and said receiver in registering, spaced-apart positions;

a ground conductor said spaced openings;

a hollow end cap having at least one peripheral wall; and a coiled conductor between each said piezoelectric members and said peripheral wall resiliently biasing its respect piezoelectric member against said ground conductor.

* * * * *

UNITED STATES PATENT AND TRADEMARK OFFICE
CERTIFICATE OF CORRECTION

PATENT NO. : 4,964,090

DATED : October 16, 1990

INVENTOR(S) : Michael C. McCarthy

It is certified that error appears in the above-identified patent and that said Letters Patent is hereby corrected as shown below:

On the title page, in item [57] Abstract:

Line 2, "spaed-apart" should read --spaced-apart--.
Line 13, "conenctors" should read --connectors--.
Line 13, "caried" should read --carried--.

Column 6, line 19, "having a spaced transmitter piezoelectric member and a" should read --having a transmitter piezoelectric member and a spaced--.

Column 8, line 5, "respect" should read --respective--.

Signed and Sealed this

Eleventh Day of August, 1992

Attest:

DOUGLAS B. COMER

Attesting Officer

Acting Commissioner of Patents and Trademarks